Dec. 19, 1961  C. A. BURKHARD ET AL  3,013,444
BEARING CONSTRUCTION
Filed June 25, 1957
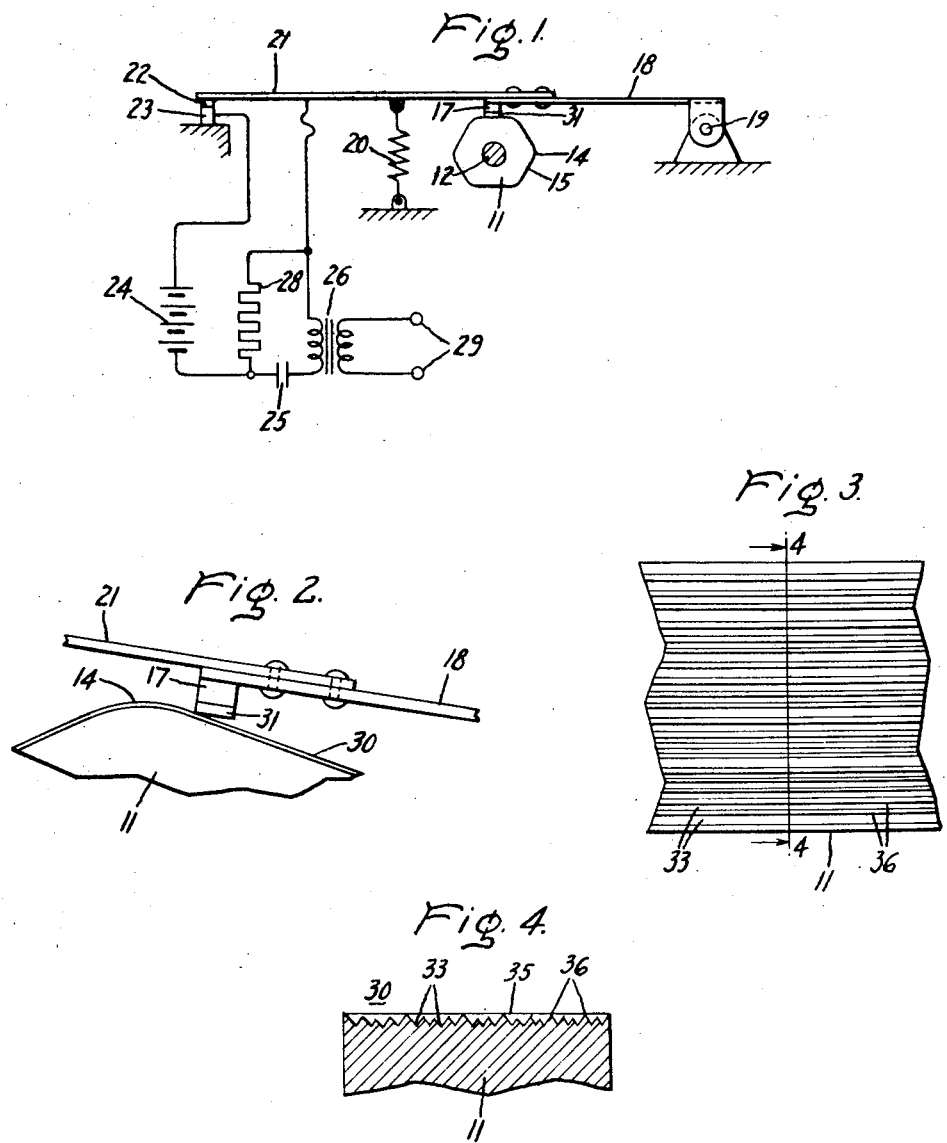
Inventors:
Charles A. Burkhard,
Samuel P. Jones,
by David P. Opple
Their Attorney.

# United States Patent Office 3,013,444
Patented Dec. 19, 1961

3,013,444
BEARING CONSTRUCTION
Charles A. Burkhard, North East, and Samuel Paul Jones, Erie, Pa., assignors to General Electric Company, a corporation of New York
Filed June 25, 1957, Ser. No. 667,848
11 Claims. (Cl. 74—567)

Our invention relates to a low coefficient of friction, long wearing bearing and, more particularly, to a rotatable cam surface adapted to have the cam follower slidably operable thereby.

For many years, the automobile industry has provided in the ignition system a cam distributor which rotates to provide for the timing of the spark. In this system, the cam follower is adjusted to open the electrical contact at any time one of the high spots on the distributor head engages the cam follower. With the use of this device, it is necessary from time to time to adjust the gap or "set the points." Since the engine of the car may be driven at several thousand revolutions per minute, it is apparent that the friction between the cam follower and the high points of the cam generates considerable friction heat. To eliminate this heat, it has been the practice of the industry to lubricate therebetween.

It has been a problem of the railroad industry for many years to measure the speed of the axle for several purposes. Since the electric traction motors of a locomotive are required to provide maximum power at all speeds, it is necessary to change some of the circuit connections at various "transition" speeds. One indication may allow proper determination of speed to determine points of transition of the traction equipment of a locomotive. A second indication could be used to energize a speedometer and still a third indication could provide a signal to indicate wheel slip or slide when one of the axles is rotating at a speed different from that of the other of the axles.

One measure of the speed of rotation uses a capacitor charging and discharging system with the frequency indicating the speed of rotation. It would appear to be a simple matter to use a device similar to an automobile distributor for moving such a switch contact since the two systems apparently operate in the same manner. However, we have found that attempts to do this do not solve the problem satisfactorily. Because of the tens of thousands of miles that the locomotive is driven every month and the millions of rotations of its axles, the lubrication of the bearing surface is impracticable. We found that periodic lubrication of this surface was not the correct solution because of the critical limits of oil required. If infrequent maintenance is attempted, the oil dries to a film which can erode the surface. On the other hand, with the rotational speeds of these cams, it is essential that there is no excess oil on the surface to be thrown therefrom by centrifugal force to contaminate adjacent electrical contacts.

The next obvious solution was to place a wicking member on the surface to provide a constant oil flow to the surface. This is not feasible because the oil feed can not be critically regulated. Again, too little oil allows the surface oil to dry, and too much oil provides sufficient oil to be thrown in the surrounding area and thus destroys the conductivity of the contacts operated by the cam follower to carry a current used to charge the capacitor.

We have also found that because of the speed of rotation, it is not practicable to use a roller cam follower because the added weight of the roller would prevent close following of the cam contour. In other words, with reasonable spring bias, the inertia of a roller type cam follower is great enough to prevent it from dropping into the flat portions of the cam at high speeds. Considering the fact that the speed of a train may approach 110 miles per hour and the rotation of the shaft will sometimes approach 1000 revolutions per minute, the use of a heavy roller type cam follower would require a spring pressure causing excessive wear of the mating surfaces.

The next approach attempted was to use a dry type lubrication which provides a slippery surface that will not require periodic maintenance. Polytetrafluoroethylene, because of the low coefficient of friction, is recognized as being a very good dry bearing material. However, even with a very low mass in the cam follower used, bearing loads may exceed the point of deformation or plastic flow of polytetrafluoroethylene. This results in the necessity for frequent regapping of the contacts or replacement of the cam follower. Both of these procedures result in prohibitively expensive maintenance costs.

In contrast, bronze filled polytetrafluoroethylene makes superior cam followers. But with the normal finish on the cam surfaces, even bronze and polymer cam followers were found to wear out within a month thus preventing accurate readings of wheel slip, or vehicular speed. In order to overcome the rapid wearing of the bronze filled polytetrafluoroethylene cam followers, the surface of some of the cams were polished and some were chrome-plated to reduce friction. Surprisingly, instead of improving wear, this smoother surface caused increased wear. Also, blue powder was deposited throughout the housings containing the chromium plated cams.

Therefore, an object of our invention is to provide a simple and inexpensive cam follower bearing arrangement which is reliable, will have long life, and require very little maintenance and no lubrication.

Another object of our invention is to provide a bearing having a composite bearing surface which is self-lubricating.

Briefly, in accordance with our invention in one form thereof, a cam follower having a bronze filled polytetrafluoroethylene bearing surface is adapted to engage a cam having a tetrafluoroethylene polymer film coating. In order to have this polymer film adhere to the surface of the cam, it is prepared especially by abrasion. After this coating is forced into abraded grooves on the cam surface, the friction between the cam follower and the cam is reduced to a minimum. We have found it most practicable to use a very low mass cam follower with resulting light spring pressure to cause engagement of the cam contour by the cam for all speeds contemplated.

The subject matter which we regard as our invention is particularly pointed out and distinctly claimed in the concluding portion of this specification. Our invention, however, both as to its organization and method of operation together with further objects and advantages thereof will best be understood by reference to the following description taken in connection with the accompanying drawing, in which:

FIG. 1 is a side view of the cam and cam follower showing the electrical connections contemplated by the contact;

FIG. 2 is an enlarged detail view of the cam surface and the cam follower surface shown in FIG. 1;

FIG. 3 is a magnified top view of the uncoated cam surface; and

FIG. 4 is a side view of the coated cam surface.

Referring now to the drawing, in which like numerals refer to similar parts, in FIG. 1, we have shown a cam bearing 11 drivingly secured to a shaft 12 to rotate therewith. This rotation causes respective raised arc portions 14 and flat portions 15 to pass under a cam follower 17 which is positioned to engage the cam 11. The cam follower 17 is mounted on an insulating shaft 18 which is pivotably supported by a bearing 19, with contact between the cam 11 and the cam follower 17 being maintained by a relatively soft spring 20.

One use of our invention is to provide a dry bearing for a speed signal switch. As the cam 11 rotates to place a raised arc portion 14 under the cam follower 17, an extension 21 of the shaft 18 drives a movable contact 22 of a switch to control a circuit connection. In the device shown, the contact 22 is moved by the raising of the extension 21 from a stationary contact 23 to open the circuit of a capacitor charging arrangement.

When the contacts are engaged by the tension of the spring 20 operating on the extension 21 as shown, current flows from a battery 24 through the contacts 22 and 23 to a capacitor 25 and a transformer 26. When the contacts 22 and 23 are opened, the capacitor discharges through a resistor 28 to reverse the flux within the transformer 26. Thus, the capacitor 25 will charge each time the contacts are closed and discharge each time the contacts are opened. The impedance characteristics of the transformer 26, the capacitor 25 and the resistor 28 are chosen to provide a charging and discharging current in the capacitor which will be of a similar magnitude for the frequencies contemplated. Thus, a transformer 26 provides an alternating current signal across its output terminals 29 proportional to the frequency of the opening of a contact 22.

By providing a transformer 26 which is saturable by this magnitude of current, the volt second output of the transformer terminals 29 is directly proportional to the frequency of rotation of the shaft 12. Thus, we have provided a signal which is proportional to the frequency of rotation of a device such as the axle of a locomotive. Another cam follower capacitor charging circuit is explained in detail in the Letters Patent of the United States Number 2,592,342, issued April 8, 1952, to W.D. Ryckman, Jr., and assigned to the assignee of the present application. Of course, other uses of this cam and cam follower arrangement will be obvious to those skilled in the art.

With a normally finished polish of the cam surface, we have found that the cam follower 17 is abraded severely by the cam 11. In a system where the cam is designed to rotate a million or more times a month, this erosion may cause inaccuracies which prevent operation of the system when the contact 22 does not open. Obviously, such a failure will prevent an indication of rotation of the shaft 12 and will also prevent an indication of speed or wheel slip.

In FIG. 2, we have shown a surface 30 of the cam 11 and the detail view of the cam follower 17. In the application we are contemplating, it is not feasible to lubricate with oil the surface between the cam and the cam follower. In order to prevent rapid erosion of the cam follower 17, we have made it of slippery dry lubricant such as a tetrafluoroethylene polymer.

However, since polytetrafluoroethylene itself is too soft to withstand even this relatively small load for extended periods of time, we have added, at the contact surface 31, a powdered metal filler to strengthen it. Although this polymer and various other bearing metals work well, according to our invention, we prefer to place a mixture of polytetrafluoroethylene and bronze on the sliding surface 31 of the cam follower 17.

It might be assumed that a highly polished or a smooth chrome plated cam surface 30 would be most effective in reducing the sliding friction of the cam 11. However, this is not the case. In fact, our attempts to provide such a smooth surface by chromium plating resulted in a powdery substance of oxides of chromium and the other metals being deposited in the area of the cam. Surprisingly, with a smooth chromium surface, wear of the cam follower surface is accelerated.

It is well known that adjacent sliding surfaces of polytetrafluoroethylene have very low friction. However, because of this lubricating polymer's property of having substantially no adhesive attraction toward any common substances, it is difficult to apply permanently to any smooth surface and particularly to a rotatable surface such as the surface 30 of the cam 11. This is especially true since the centrifugal force during rotation of the cam is great enough to loosen any ordinary surface coating of this material. Because of the smoothness of the chromium coating and the lack of adhesion of this polymer, it is impracticable to attempt to place a polymer coating on a surface 30 which has been chrome plated.

Therefore, according to our invention, we have found that a slightly roughened steel surface 30 is far superior to a smooth chromium surface. For the first few thousand revolutions, the roughened surface will abrade the polymer from the surface 31 of the cam follower and remove minute particles of polytetrafluoroethylene which become lodged in the grooves or crevices 33 of the surface to form a polymer coating 35 (FIG. 4). We have found that this surface will maintain the polymer in the crevices 33 when the surface 30 is burnished or ground to a roughness in the order of 7 microinches (FIG. 3). Surprisingly, roughening the cam surface 30 causes it to maintain a thin coating 35 of polytetrafluoroethylene, whereby we have increased the life of the wheel slip detection contact arrangement by more than ten times. We have found that a cam follower will wear only two tenthousandths of a gram when run under a three pound spring against a cylindrical surface traveling at 2200 feet/minute when the grooves are parallel to the line of motion as shown (FIG. 4). However, grooves cut axially or on a bias will maintain the polymer satisfactorily and wear under similar testing is only 17 and 37 ten-thousandths of a gram respectively. It may thus be seen that we have provided a bearing member having a composite bearing surface wherein the bearing surface is defined by the ridges 36 and having a coating of polytetrafluoroethylene 35 in the grooves 33 between the ridges. With this construction it may be seen that the loading applied to the composite surface will be carried by the bearing member 11, while the polytetrafluoroethylene between the ridges provides a lubricant for the bearing surface.

In high speed applications, we have found less than 4–5 microinch groove roughness unsatisfactory because such a groove will not properly maintain the polymer. However, 9–10 microinch burnished grooves are optimum considering manufacturing tolerances, etc. In fact, as much as 70 microinch groove roughness is far superior to a polished surface. However, larger grooves result in larger ridges or raised portions 36 and create an excessive wear of polymer from the follower surface 31 when the bearing surface 30 is being coated to fill the large grooves 33. When the grooves 33 are smoother than 5 microinches, the polymer will not stick in the grooves or if any does build up in the grooves, it will tend to be thrown from the surface 30, and the steel or chromium remaining will continually erode the cam follower surface 31.

We have found the thin polymer coating 35 can be applied to the surface of the cam 11 by several methods, the following being cited as a few examples of the methods:

(1) The cam, after being cleaned carefully of all oil, grease, and other foreign substances, is dried and then coated by pressing the polymer onto the surface while the cam is in motion;

(2) The cam, after being cleaned carefully of all oil, grease and other foreign substances is dried and then coated by the application of a polymer emulsion which is dried in a vacuum;

(3) The cam, after being cleaned carefully of all oil, grease and other foreign substances, is dried and allowed to run in while engaging a supply of the bronze-polymer composition to give the desired polymer film.

We have found, also, that it is desirable for reliable electric contact of the particular contacts 22 and 23 to have approximately 300 grams pressure to provide a low resistance connection. Of course, this pressure may be varied depending on the area of the contact, the current density, the material of the contact and the ultimate mating surface desired for the expected service. It is obvious that this pressure, with the leverage involved, is sufficient to severely load the cam follower surface 31. With any high frictional forces between the sliding surfaces 30 and 31, destructive heat would be generated. However, with this dry polymer lubrication, on both the cam 11 and the cam follower 17, we expect to be able to count the rotation of the shaft 11 to as high as ten million revolutions at speeds up to 1500 revolutions per minute.

The portion of our invention which we have found to be most astonishing is the fact that a highly polished cam surface 30 will increase rather than decrease the wear of the cam follower surface 31. This was wholly unexpected. The fact that a rough surface is desired indicates that many new materials such as ceramic bodies may be suitable for such applications in either cams or bearings.

While we have shown and described one embodiment of our invention, other modifications will occur to those skilled in the art. We desire it to be understood, therefore, that we intend the appended claims to cover all such modifications within the true spirit and scope of our invention.

What we claim as new and desire to secure by Letters Patent of the United States is:

1. A cam assembly comprising a polytetrafluoroethylene cam follower adapted to contact and slide on a surface provided by a rotatable cam member, said surface having grooves of a depth between 5 and 70 microinches substantially covering said surface and defining ridges therebetween, the grooves being substantially filled with polytetrafluoroethylene, whereby said surface is defined by said ridges and the polytetrafluoroethylene provides a dry lubricant for said surface.

2. A cam assembly comprising a polytetrafluoroethylene cam follower adapted to contact and slide on a bearing surface provided by a mating cam member, said surface having grooves of a depth between 5 and 70 microinches substantially covering said surface and defining ridges therebetween, the grooves being substantially filled with polytetrafluoroethylene whereby said surface of said cam member is defined by said ridges, said cam follower having a metal filler therein to provide additional strength therefor.

3. The cam assembly of claim 2 wherein said metal filler is bronze.

4. A cam assembly comprising a polytetrafluoroethylene sliding cam follower and a rotatable cam member, said cam member having a bearing surface with grooves of a depth on the order of 10 microinches substantially covering the surface and defining ridges therebetween, the grooves being substantially filled with polytetrafluoroethylene whereby the bearing surface of the cam member is defined by said ridges to provide a composite bearing surface.

5. The cam assembly of claim 4 wherein said polytetrafluoroethylene cam follower is reinforced with a bronze filler.

6. An operating device for a switch contact mounted on a pivotable support lever having a polytetrafluoroethylene sliding cam follower thereon comprising, a cam member having a surface for engaging the cam follower to move the lever and open or close the contact, said surface having grooves of a depth between 5 and 70 microinches substantially covering the portion of the surface engaging the cam follower, said grooves defining ridges for abrading a portion of the polytetrafluoroethylene from the cam follower to substantially fill said grooves to provide mating polytetrafluoroethylene sliding surfaces, the surface of said cam being defined by said ridges.

7. A bearing assembly comprising a bearing member providing a bearing surface having grooves of a depth between 5 and 70 microinches therein substantially covering the surface and defining ridges therebetween, the grooves being substantially filled with polytetrafluoroethylene to provide a composite bearing surface defined by said ridges.

8. A dry bearing assembly comprising a cam surface adapted to maintain a dry lubricant thereon, grooves of a depth on the order of 10 microinches substantially covering said surface and defining ridges therebetween, said grooves being substantially filled with polytetrafluoroethylene to provide a composite cam surface defined by said ridges.

9. A dry bearing assembly comprising a cam, and a mating polytetrafluoroethylene cam follower adapted to interact with a surface provided by said cam, said surface having grooves of a depth between 5 and 70 microinches substantially covering said cam surface and defining ridges therebetween, said grooves being substantially filled with polytetrafluoroethylene whereby said cam surface is defined by said ridges and the cam and cam follower contact on polytetrafluoroethylene surfaces.

10. A bearing member having a bearing surface with grooves therein of a depth between 5 and 70 microinches substantially covering said surface and defining ridges therebetween, said grooves being filled with polytetrafluoroethylene whereby the bearing surface of said member is defined by said ridges, and the polytetrafluoroethylene provides a dry lubricant for said bearing surface.

11. The bearing member of claim 10 wherein the grooves have a depth on the order of 10 microinches.

References Cited in the file of this patent

UNITED STATES PATENTS

| | | |
|---|---|---|
| 1,624,113 | Norviel | Apr. 12, 1927 |
| 1,894,644 | Sturdevant | Jan. 17, 1933 |
| 2,148,424 | Crocker | Feb. 28, 1939 |
| 2,166,901 | Coffey | July 18, 1939 |
| 2,330,635 | Siebel | Sept. 28, 1943 |
| 2,468,239 | Saulino | Apr. 26, 1949 |
| 2,488,446 | Swiss | Nov. 15, 1949 |
| 2,517,142 | Staley | Aug. 1, 1950 |
| 2,536,183 | Jamieson | Jan. 2, 1951 |
| 2,616,307 | Mallory | Nov. 5, 1952 |
| 2,683,894 | Kritchener | July 20, 1954 |
| 2,689,380 | Tait | Sept. 21, 1954 |
| 2,720,119 | Sherman | Oct. 11, 1955 |
| 2,728,698 | Rudner | Dec. 27, 1955 |

FOREIGN PATENTS

| | | |
|---|---|---|
| 726,920 | France | Mar. 15, 1932 |